United States Patent [19]

Mayoux

[11] Patent Number: 4,494,241
[45] Date of Patent: Jan. 15, 1985

[54] INSTALLATION FOR THE TRANSMISSION OF INFORMATIONS BY AN OPTICAL BUS LINE

[75] Inventor: Jean-Jacques Mayoux, Boulogne Billancourt, France

[73] Assignee: Electronique Marcel Dassault, Paris, France

[21] Appl. No.: 224,810

[22] Filed: Jan. 13, 1981

[30] Foreign Application Priority Data

Jan. 14, 1980 [FR] France .................. 80 00729

[51] Int. Cl.³ .......................................... H03K 9/02
[52] U.S. Cl. ...................... 375/76; 307/356; 375/87; 375/98
[58] Field of Search ............. 358/165, 176, 178, 171, 358/172; 340/825.57, 511; 307/234, 350, 530, 532, 354, 356; 328/115, 116, 117, 119, 162; 375/24, 76, 94, 104, 87, 98; 455/608; 364/571

[56] References Cited

U.S. PATENT DOCUMENTS

| | | | |
|---|---|---|---|
| 2,797,261 | 6/1957 | Polyzou | 375/36 |
| 2,863,046 | 12/1958 | Eliason | 375/98 |
| 3,281,530 | 10/1966 | Sennhenn | 358/171 |
| 3,557,305 | 1/1971 | Dann | 358/171 |
| 3,566,025 | 2/1971 | Rognon | 358/178 |
| 3,598,902 | 8/1971 | Davis | 358/178 |
| 3,813,488 | 5/1974 | Cavett et al. | 358/171 |
| 3,891,319 | 6/1975 | Meinke et al. | 356/5 |
| 3,912,864 | 10/1975 | Van Der Valk | 358/165 |
| 3,989,959 | 11/1976 | Renirie et al. | 328/116 |
| 4,020,423 | 4/1977 | Guyot et al. | 328/115 |
| 4,051,363 | 9/1977 | Fish | 455/608 |
| 4,099,124 | 7/1978 | Sharpe et al. | 375/98 |
| 4,131,857 | 12/1978 | Clymer | 307/354 |

FOREIGN PATENT DOCUMENTS

| | | |
|---|---|---|
| 2050995 | 4/1972 | Fed. Rep. of Germany . |
| 2529479 | 7/1975 | Fed. Rep. of Germany . |
| 2450633 | 8/1975 | Fed. Rep. of Germany . |
| 2707341 | 8/1978 | Fed. Rep. of Germany . |
| 2853353 | 7/1979 | Fed. Rep. of Germany . |

OTHER PUBLICATIONS

Erdel A. Strehl, Glasfaser-Bussysteme zür Signalürtragung In Bordnetzen, *Frequenz,* Dec. 1977, pp. 364-368.
*Medical Biological Engineering*—Technical Note: Baseline Stabilization of Physiological Signals, Nov. 1971, pp. 711-712.
Dragoe, Fiber Optic Data Bus, Proc. of Nat. Electr. Conf., Oct. 29-31, 1979, pp. 179-183.

*Primary Examiner*—Benedict V. Safourek
*Attorney, Agent, or Firm*—Curtis, Morris & Safford

[57] ABSTRACT

A bus line installation for the transmission of informations between a plurality of transmitters and a plurality of receivers.

The signals transmitted by the bus line are optical signals. Each receiver comprises opto-electronical means for the transformation of optical energy into electrical energy and means for bringing the electrical signals representative of said transformation to the shape for which a part of the receiver similar to that of a bus line installation transmitting electrical signals is operative.

15 Claims, 34 Drawing Figures

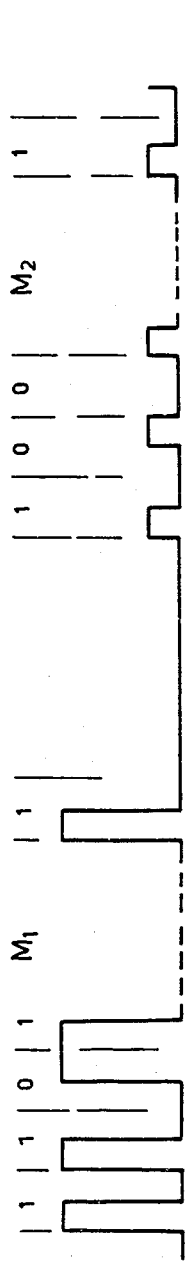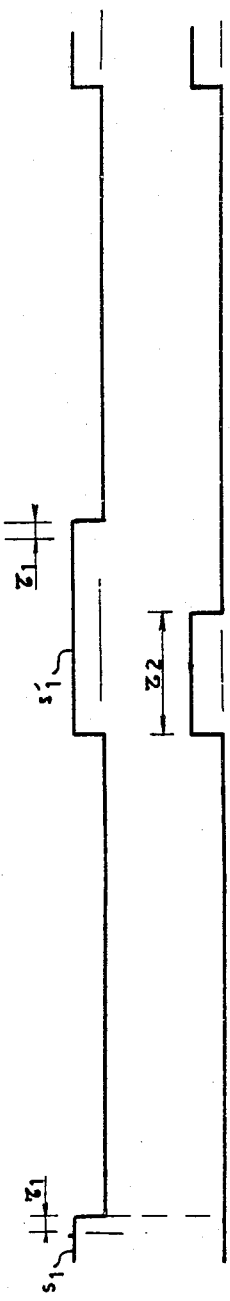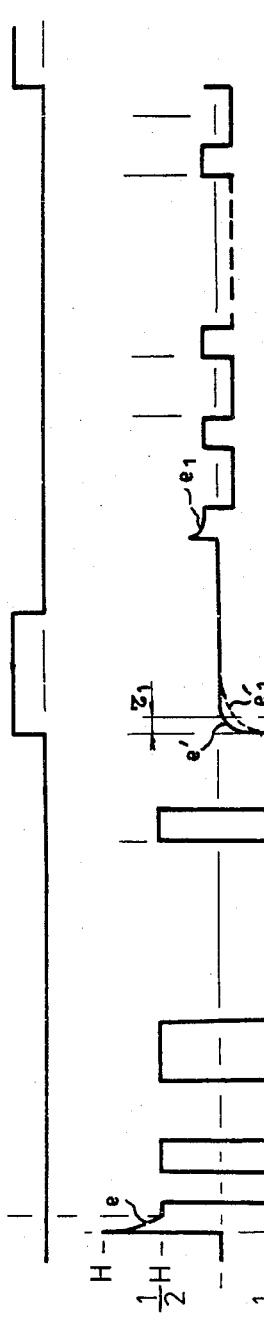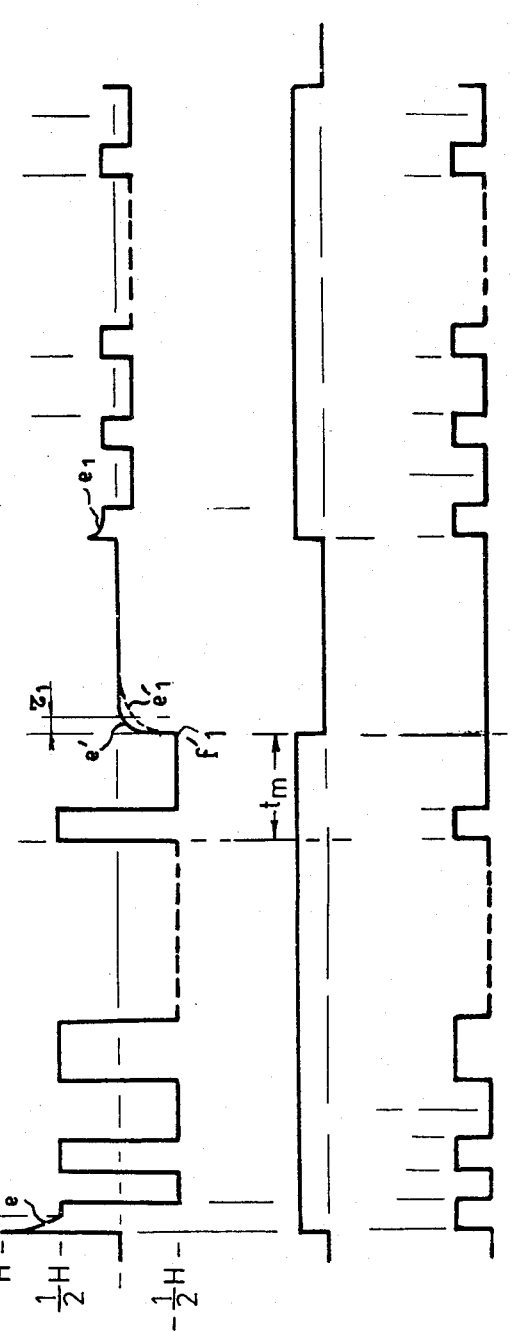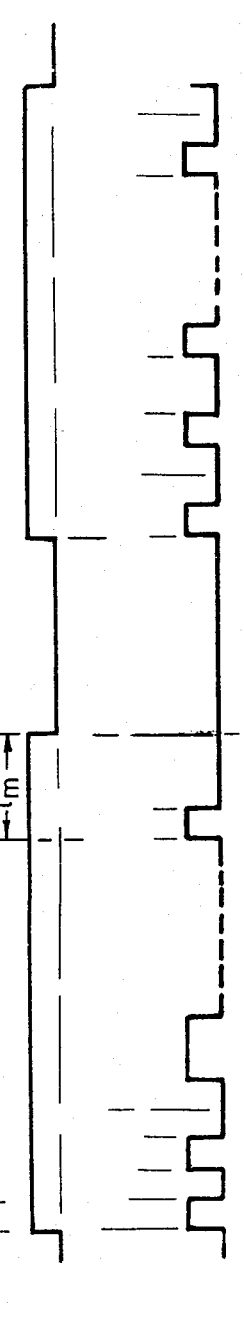

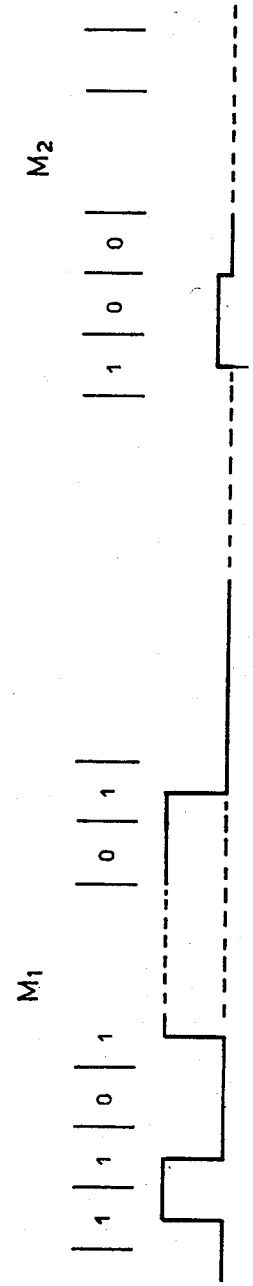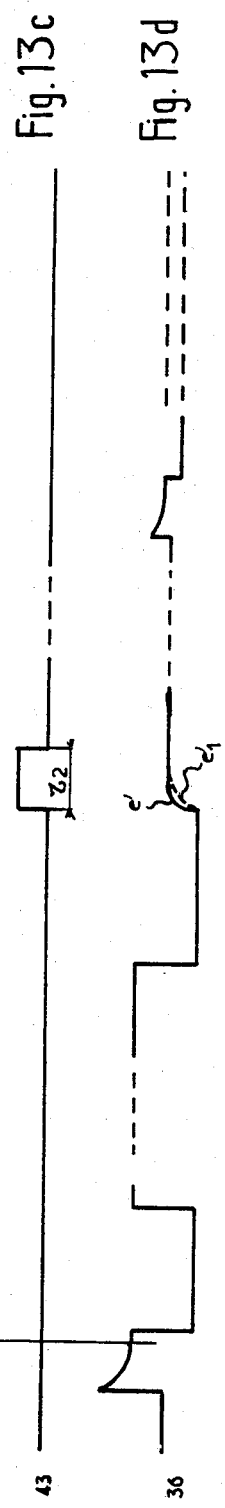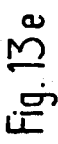

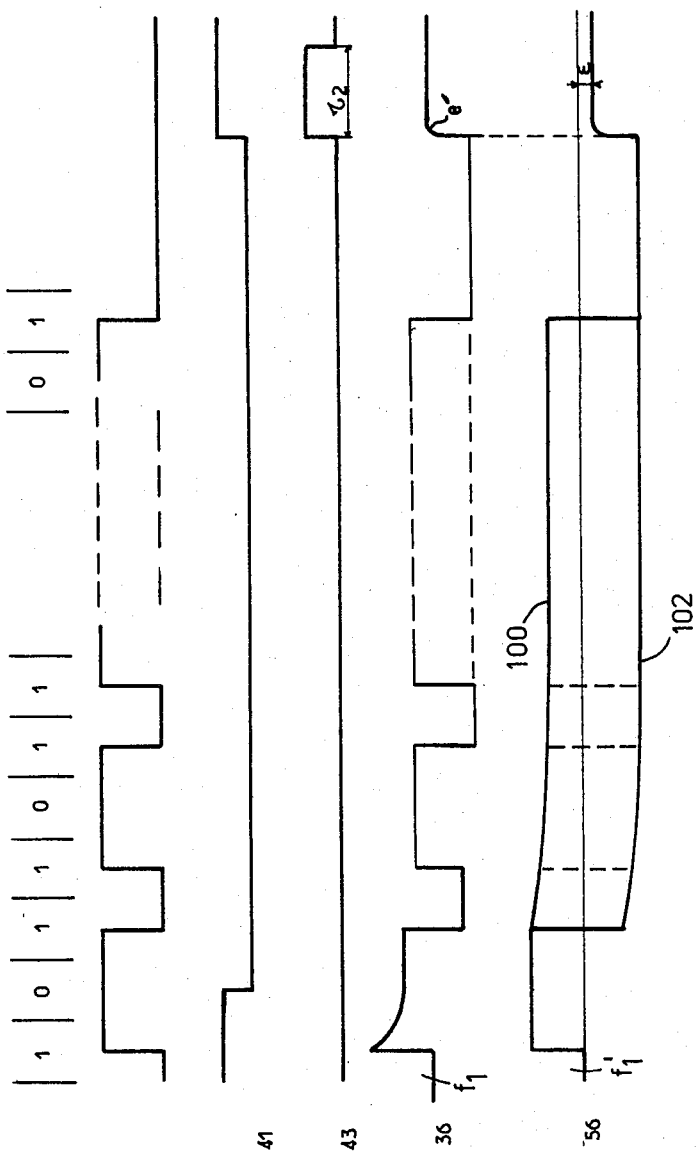

Fig. 15d

INSTALLATION FOR THE TRANSMISSION OF INFORMATIONS BY AN OPTICAL BUS LINE

The object of the invention is an installation for the transmission of informations via an optical bus line.

An information transmission installation via a bus line comprises transmitting stations, receiving stations and/or transmitting-receiving stations and control means or management unit(s), the stations and control means being connected to one same line or bus line and organized in such a way that a determined transmitter may be set in communication with one or several determined receivers, that the informations transmitted may not be mistaken one for the other and eventually that checkings provided the insurance that the message has been well received by the receiver or receivers to which it was intended and under conditions guaranteeing its correct interpretation are satisfied.

The bus line comprises one or several transmission lines, each one of which can have a particular function.

The prime object of the present invention is a bus line information transmission installation capable of ensuring the transmission via an optical route.

The bus line, in such a case, is made of optical fibres and the connection between the bus line and the transmitters, the receivers or the transmitters-receivers as well as with the management unit or units is also carried out by optical fibres.

The bus line transmits the informations in the form of characters defined by a succession of illumination periods (marks) and dark periods (spaces), or bits, thereby belonging to a pulse-code modulation, of the type sometimes called PCM.

The bus line also transmits sync bits, the duration of which is eventually different to that of the other bits.

A succession of character bits transiting from one equipment module to one or several other equipment modules forms a message, and an assembly of one or several messages transiting on one or several transmission lines constitutes an exchange.

Usually, a first message, or control message, designates the concerned transmitting and receiving equipment or equipments and another message or data message, transmits the data as such.

Preselection or discharge acknowledgement messages may be foreseen.

A sync bit may occur at the beginning of a message and/or periodically during a message.

Two messages transmitted in succession on the same line using a modulation at two levels, one of which corresponds to the brightness (or mark sense) and the other to the darkness (or space sense), are separated by a predetermined minimum duration, the transmission using here a time-division multiplexing.

Management units determine, before each data transmission, which equipment module will be the concerned transmission equipment and receiving equipment or equipments by sending them the necessary instructions via the bus line, following a definite procedure.

The equipment modules may be constituted as independent units or be comprised within the transmitters and/or receivers themselves.

In an installation according to the present invention, optical couplers derive part of the optical energy circulating on the bus line towards the receivers or towards the management units, or allow the injection in a bus line of optical signals generated from the transmitting stations or the management units, or they allow the injection in the bus line of optical signals generated from the transmitters or the management units.

According to the invention, the transmitters, receivers, transmitters-receivers and management units are partly of the type used in the installations where the signals transmitted are electrical signals, thereby taking advantage, notably for the processing of the information, of the extremely numerous works carried out in this sphere.

It is an object of the invention to solve the problems posed by the transmission of informations via the optical route and not via a purely electrical route, as is the case in the standard bus line installations.

On the one hand indeed, whereas in the transmission of electrical signals the voltage average value representative of said signals can be zero, or can be easily made zero, it is not the case when the signals transmitted are optical signals.

On the other hand, and maybe predominantly, the insertion of optical couplers which are indispensable either for deriving optical energy from the line towards the optoelectronical receiving members, or for injecting optical energy provided by the electro-optical transmitting members towards the main line, introduces losses which, in the case of a transmission via the optical route, are incomparably higher than those resulting from an electrical transmission, so that the amplitude of the informations reaching a station can, according to the origin of said informations, vary considerably, in the order of 1 to 100.

It is therefore a particular object of the invention to provide a bus line installation for the transmission of signals via the optical route, which operates satisfactorily in spite of such difficult circumstances.

The installation according to the invention is characterized in that it comprises for each receiver means for shaping the electrical signal resulting from the optoelectronical transformation of the signals transmitted via the line, so as to bring each such electrical signal to the shape for which the processing devices of the receiver are best suited.

Such an installation is usable for the transmission of information on aircrafts or other air-ships, also in ships, armoured tanks, land installations, etc.

In the following description which is given by way of example, reference is made to the accompanying drawings wherein:

FIG. 1 is a general schematic view of an installation,
FIG. 2 is a diagram of a bit,
FIG. 3 is a diagram of another bit,
FIG. 4 is a diagram of two bits,
FIG. 5 is a diagram of a sync bit,
FIG. 6 is a diagram of another sync bit,
FIG. 7 is a block diagram of an apparatus according to the installation which is part of a receiver of an installation with an optical bus line,
FIGS. 8a to 8f are waveform diagrams for explaining the operation of the apparatus of FIG. 7,
FIG. 9 is another waveform diagram of a signal, showing noise,
FIG. 10 is still another waveform diagram showing a signal with reduced noise,
FIG. 11 is a diagram of bits according to another modulation,
FIG. 12 is a diagram of bits according to a variation of the modulation according to FIG. 11, FIGS. 13a through 13f are chronograms corresponding to said modulation, FIGS. 14a through 14e are chronograms for explaining another possible type of modulation, FIGS. 15a through 15d are chronograms for explaining yet another type of modulation, FIG. 16 is a general schematic view of an installation, for an alternative embodiment, FIG. 17 is a general schematic view of an installation, for another embodiment.

The installation comprises a bus line L (FIG. 1) with one or several transmission lines—in the latter case playing each a determined part—and each of the lines is made of a plurality of optical fibres, or of bundles of optical fibres. To each transmission line is connected a transmitting or emitting station $E_1$, $E_2$, etc., a receiving station $R_1$, $R_2$, $R_3$, etc., or also a receiving-transmitting station such as $E_1R_1$, as well as a management unit or control unit U for the control of the various stations E, R and ER, the checking of their operation, the control of the messages transmitted or received by said stations, etc.

The management unit can also be incorporated to each of the transmitters or receivers or into some of them.

The transmitting stations $E_1$, $E_2$, etc. are connected to the bus line L by optical couplers $c_1$, $c_2$, etc., placed at the end of connections $r_1$, $r_2$, made of optical fibres. The receivers $R_1$ and $R_2$ are also connected to the line L by one or several optical fibres $f_1$, $f_2$, with interposition of optical couplers $p_1$, $p_2$, while the receiver $R_3$ is directly connected to the line R by an optical coupler $p_3$.

The receivers R and the transmitters-receivers ER comprise a part or equipment module R', E'R', of the type often used in the standard bus line installations and capable of processing electrical signals and a part R", E"R", comprising transducers for the transformation of the light energy into electrical energy. The transmitters comprise electro-luminescent diodes or laser diodes $d_1$, $d_2$, etc. The receivers comprise photo-receiving diodes, eventually of the avalanche type, or phototransistors, $b_1$, $b_2$, etc.

The messages transmitted on line L consist of the light energy modulated by PCM coded pulses. A message thus formed is a succession of bits "1" and of bits "0". The duration of each bit is t. A bit "0" comprises, in the Manchester modulation, a dark period of a duration equal to t/2 followed by an illumination period of same duration (FIG. 2). A bit "1" comprises an illumination period of duration equal to t/2 followed by a dark period of same duration (FIG. 3).

FIG. 4 shows a bit "0" followed by a bit "1".

The transmission may comprise sync bits of one type or of several types.

In the present example, synchronization is obtained from sync bits the duration of which is in principle greater than that of the bits foreseen for the information. A sync bit "0" is shown in FIG. 5. It comprises a first dark period equal to 3t/2 followed by a second illumination period of same duration.

A sync bit at state "1" is, by contrast, formed of a first illumination period of duration equal to 3t/2 (FIG. 6) followed by a second dark period of same duration.

An apparatus R" according to the present invention, coupled to a receiver of electrical signals R' or to a transmitter-receiver of electrical signals E'R' comprises at its input an opto-electronical receiving member b or 31 (FIG. 7): a photo-receiving diode, a phototransistor, which receives the light from the output of an optical fibre 32 the other end of which is connected to the bus line L via an optical coupler p. The opto-electronical member 31 is mounted in the input circuit 33 of a current/voltage preamplifier 34 delivering at its output 35 a voltage which is a function of the current generated by member 31. The preamplifier 34 can be sensitive or not sensitive to a continuous current circulating on its input circuit 33. If it is not sensitive to the continuous current, its high-pass cut-off frequency has to be sufficiently low so as not to alter the input message.

In one or the other case, the output of the preamplifier 34 is at a low impedance so that the output voltage is effectively a function of the input current and is in particular independent of the load conditions of the preamplifier.

The output 35 of the preamplifier 34 is connected to the input 36 of an amplifying, limiting, and filtering apparatus 37, through a capacitor 38.

The amplifier which is comprised in apparatus 37 may be alternating if the modulation used implies that for a message the total duration of the dark phases is equal to that of the illumination phases. In the contrary case (for example a Miller modulation), the amplifier has to amplify the continuous signals.

In one or the other case, the amplifier which is comprised in apparatus 37 provides a sufficient amplification for the weaker signals to be exploitable in the circuits which follow.

Apparatus 37 limits also the strong signals so that they are also exploitable in the circuits which follow.

Apparatus 37 provides thus an optimization of the signal/noise ratio.

The filtering means which apparatus 37 comprises is of the low-pass type. It eliminates the high frequency noise generated in the amplifier 34.

The circuit connecting the preamplifier 34 with apparatus 37 may be connected to earth via a circuit 39, comprising a resistor $\rho$ and a first static switch, shown schematically at 41, exhibiting an intrinsic resistance $\rho_1$, and by a second circuit 42 comprising a second static switch 43 exhibiting an instrinsic resistance $\rho_2$. The resistor $\rho'$ of apparatus 37 is sufficiently high so that the high-pass filtering resulting from capacitor 38 and resistor $\rho'$ does not deform the input signal, when the static switches 41 and 43 are open.

The opening and closing of switches 41 and 43 are controlled by two circuits, respectively 44 and 45, issued from a switch control device 46 the input of which is connected via circuit 49 to the output 51 of a comparator 52 of the hysteresis type, having thus two symmetrical thresholds $+V$ and $-V$. The output 51 supplies an electrical signal which is exploitable by the logical circuitry R' of the receiver to which it is sent.

The electronical circuits forming the part R' of the receiver can be rigorously identical to those used for a bus line installation transmitting electrical signals, under the condition that the modulation used and the exchange procedures are rigorously identical in both cases.

The second input 61 of the hysteresis comparator 52 is connected via circuit 62 to a positive voltage source threshold circuit 63. To circuit 62 is coupled moreover an output circuit 64 from a feedback device 65 the input 66 of which is connected to the output of the comparator 52, i.e., to the circuit 51.

The electrical signals processing apparatus R' can also process the signals supplied at the output 51' of an opto-electronical transducer 50' similar to the transducer 50 just described, but the opto-electronical receiving member 31' of which is facing the output 32 of another optical transmission line which is part of the bus line L.

The output signal 35 of the preamplifier 34 corresponding to a message $M_1$ is as is shown on the diagram of FIG. 8a, for example in the case of a Manchester type pulse-code modulation the bits of which are as shown on the diagrams of FIGS. 2 and 3. The signal comprises for example a first bit at "1", followed by one bit at "1", followed by one bit at "0", followed by one bit at "1", etc., the last bit of the message being a bit at "1".

This $M_1$ message corresponds to a relatively high intensity of the light reaching the opto-electronical member 31, for example from a transmitter E close to the receiver R, the transmission by the optical bus line having thus been very little attenuated by the presence of the couplers on said line.

The next successive message $M_2$ reaching the receiver R comes from a more remote transmitter and the signal present on the output 35 of the preamplifier 34 has, in voltage, an amplitude which is distinctly weaker. It is formed in the example and still as is shown in the diagram of FIG. 8a, by a bit at "1", followed by a bit at "0", followed by a bit at "0", etc.

The light power received by member 31 can, in an installation, vary within a range of 1 to 100, i.e., a variation of 20 dB.

As long as no message is transmitted by the optical fibre 32, the switch 41 is closed, as is shown schematically by signal $s_1$ (FIG. 8b) present on the output 45 of the switching control signals generating device 46.

After a period $\tau_1$, fixed by a monostable which is comprised in device 46, which period is shorter than that corresponding to the width of a pulse, the device 46, connected to the output 51, sends via circuit 45 a signal for opening switch 41, which opening takes place when the voltage at input 36 of apparatus 37 has reached the value which is half of that corresponding to the amplitude present at the output 35, resulting from the characteristics of the filter formed by capacitor 38 and resistor $\rho$. In circuit 30 connecting the preamplifier 34 to apparatus 37, the voltage, upon arrival of a message, follows the exponential curve e (FIG. 8d).

Once the switch 41 is open, the signal present in circuit 30 reproduces that which is present at the output 35 of amplifier 34, but with a zero average value, whereas the signal at the output 35 of preamplifier 34 has an average value equal to V/2, if V is the amplitude of the signal present at said output.

It is therefore a crenel-shaped (i.e., notched) signal, symmetrical relative to value zero (i.e., ground), which is applied to the input 36 of the device 37. It is also a signal of said type which is applied to the input 56 of comparator 52, with two thresholds, which can thus provide at its output 51 the signal adapted for being processed by logical circuits comprised in part R' of the receiver.

At the end of message $M_1$, the device 46 closes again, via circuit 45, the switch 41, as is shown at $f'_1$ on the diagram of FIG. 8d. Simultaneously, the device 46 controls, via circuit 44, the closing of the second switch 43, which was open till then, so that, through the conjugated intervention of the resistor $\rho$, of the intrinsic resistance $\rho_1$ of switch 41 and of the intrinsic resistance $\rho_2$ of switch 43, the signal at the input 36 of the apparatus 37 reaches quickly value zero, following the curve e' having an exponential curve.

The closing of switch 43 is provided during a period $\tau_2$ sufficient for obtaining the return to "0" of the signal having the largest foreseen amplitude before the end of a duration equal to the minimum period separating two messages.

The switch 41, which remains closed until a moment included in the first active level of the following message, thereby contributes with switch 43 to ensuring the discharge of capacitor 38 during the period between two messages. Its closing reduces the pass-band of the receiver during said period, by improving the filtering due to resistor $\rho$, thereby having not only a re-centering function but also a filtering function.

An envelope signal of the messages, shown in the diagram of FIG. 8e, is created by an electronical device (e.g., any well-known envelope detector) detecting the presence of a message received. It is from said signal that the control signals for controlling the static switches 41 and 43 are generated.

FIG. 8b shows that the control of the switch 41 starts when the envelope signal falls to "0" and ends after a period $\tau_1$ after said signal has come back to "1".

FIG. 8c shows that the control of switch 42 starts when the envelope signal falls to "0" and lasts for a duration $\tau_2$.

Figure 1:
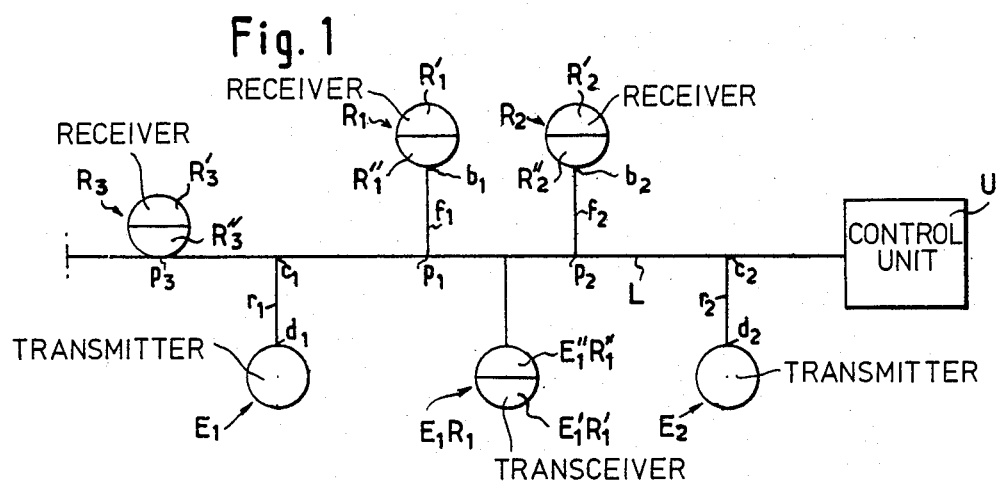
Figure 2:
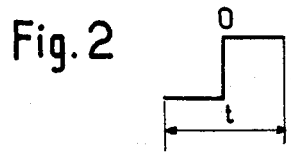
Figure 3:
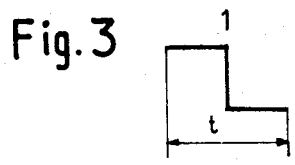
Figure 4:
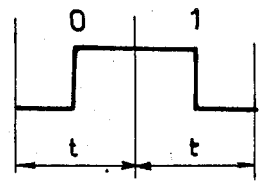
Figure 5:
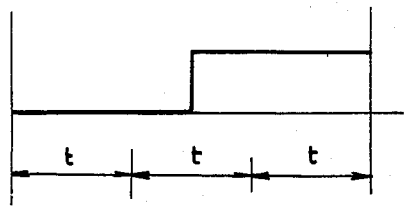
Figure 6:
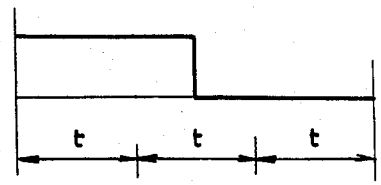
Figure 7:
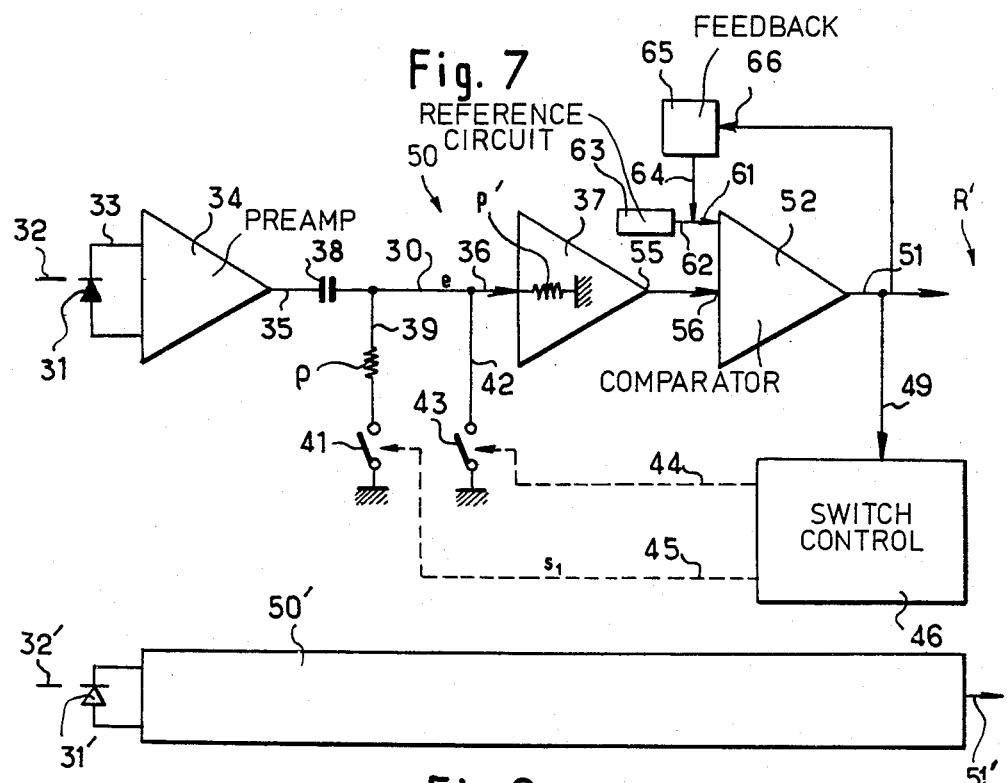

It has been stated in the hereabove description that the switches 41 and 43 are closed when the control signals delivered by the device 46 are at state "1".

The invention comprehends an embodiment according to which the circuit 42 together with its switch 43 is omitted, the return to 0 of the signal present at input 36 being then slower, as is shown in dotted line at $e'_1$ in FIG. 8d.

The arrival of the second message $M_2$ causes, in the same manner as the arrival of message $M_1$, the intervention of switch 41, the zero average value of the signal being obtained after a period $\tau_1$, as is shown by the exponential curve $e_1$. A standardized output signal appears at the output 51, as shown in FIG. 8f, having the same amplitude for both messages $M_1$ and $M_2$.

Figure 9:
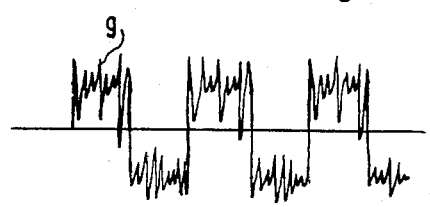

The diagram of FIG. 9 shows again the signal present at the input of the filtering, amplification and limitation apparatus 37. Said signal is in fact affected by the high frequency noise introduced by the operation of the preamplifier 34, as is shown by line g. Said noise cannot be neglected when the optical signals received by member 31 are very weak.

Figure 10:
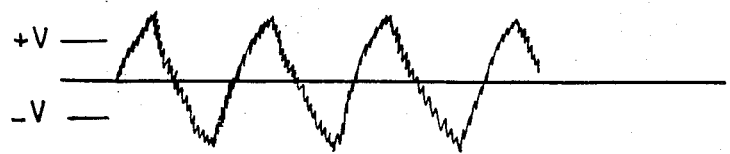

The filtering carried out by device 37 reduces the amplitude of the noise, as is shown by the diagram of FIG. 10.

The modulation used in the example described hereabove is of the so-called Manchester biphase type. The invention applies also to other types of modulations, notably to those allowing, for an equal pass-band, information densities twice higher, for example the Miller modulation.

FIG. 11 recalls what is the Miller code which is defined as follows:

"1" means a transition in the middle of the bit;
"0" means no transition if it is followed by a "1", but a transition at the end of the bit if it is followed by a "0".

The spectrum of said code has a continuous component which is not zero after processing in a circuit according to the invention, as is shown schematically by the example of FIG. 12.

In this case, the duration of the positive phases is, on the whole of several bits, somewhat greater than that of the negative phases.

In this case, the signal in circuit 30 is made symmetrical relative to a potential of predetermined value. The amplifier which is comprised in the apparatus 37 is then adapted, e.g., as a DC amplifier, for amplifying a continuous current.

The amplifying part, the limitation part, the filtering part of apparatus 37 provide then a direct, or D.C. connection up to comparator 52 (an alternative amplifier would have to re-center the signal reaching the comparator).

This type of modulation may necessitate the use of sync signals of a different characteristic (a longer period for example) to that of the data bits appearing at the beginning of each message and eventually during the message.

Failing this, the value of the first bit is defined conventionally.

Chronograms relative to the processing of the optical signals conforming to the Miller modulation are shown in FIGS. 13a–13f. FIG. 13a is a diagram of the signal received first from a message $M_1$ arriving from a transmitter station relatively close, then from a message $M_2$ arriving from a more remote station.

The diagram of FIG. 13b is representative of the control signal of switch 41 and the diagram of FIG. 13c is representative of the control signal of switch 43.

The signal present at the input 36 of apparatus 37 is shown by the diagram of FIG. 13d. In this diagram, the part e' corresponds to an embodiment comprising the two static switches 41 and 43 whereas the part shown in dotted line $e'_1$ corresponds to an embodiment according to which the static switch 43 is omitted.

The diagram of FIG. 13e is representative of the envelope signal and corresponds to the diagram of FIG. 8e.

The diagram of FIG. 13f is representative of the signal present at the output 51.

In another embodiment, adapted to the Miller code, the circuit used comprises an alternative (i.e., A.C.-coupled) amplifier between circuit 30 and comparator 52. The corresponding chronograms are shown in FIG. 14.

The signal transmitted is here a repetitive frame the pattern of which is: 1 1 0 1 1 0 1 1 0, etc.

The diagram of FIG. 14a is that of the received signal.

That of FIG. 14b is that of the control signal for switch 41.

That of FIG. 14c is representative of the control signal for switch 43. At the end of period $\tau_2$, the signal (FIG. 14d) at input 36 of apparatus 37 is always Ov and the error $\epsilon$ at the input 56 (FIG. 14e) comes from the fact that the signal, after its passage through the A.C. connection, is centered relative to its average value and not relative to its extreme values.

The connection formed by capacitor 38 is then an A.C. connection and the signal at 36 at the input of device 37 has a tendency to be centered relative to its average value during the messages. But at the end of the message, the switch 43 carries out a readjustment on Ov.

This connection is therefore the source of no error at the end of the message, once the static switch 43 is set back to 0.

In the above chronograms, no account has been taken of the fact that the preamplifier 34 has a infinite passband.

The chronograms of FIGS. 15a–15d, established in the case where a biphase code is used, are closer to reality.

Figure 15A:
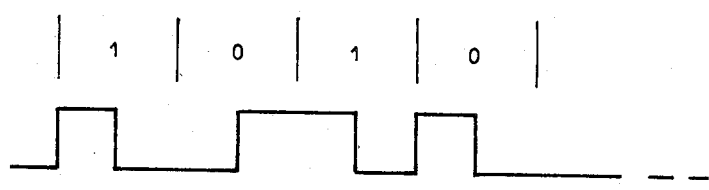

The diagram of FIG. 15a is that of the received signal.

Figure 15B:

The diagram of FIG. 15b is that of the signal at the output 35 of preamplifier 34 (except for the noise).

Figure 15C:
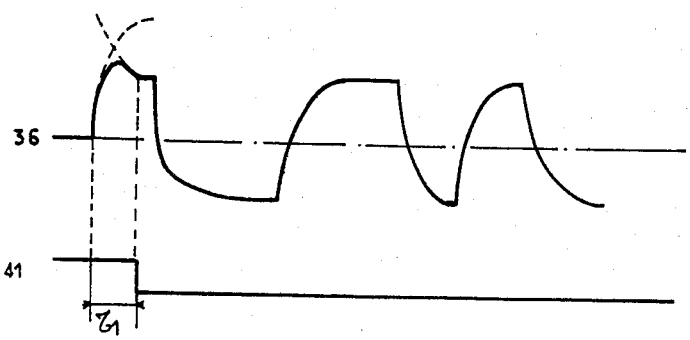

The diagram of FIG. 15c is that of the signal present at input 36 of apparatus 37.

The diagram of FIG. 15d is that of the control signal of switch 41.

One sees that it is the transfer function as a whole constituted by the preamplification, together with the circuit formed by capacitor 38, resistor $\rho$ and switch 41 which provides the centering of the signal at the end of period $\tau_1$.

The signal shaping device according to the invention is applicable to installations having a general organization different to that just described.

Figure 16:
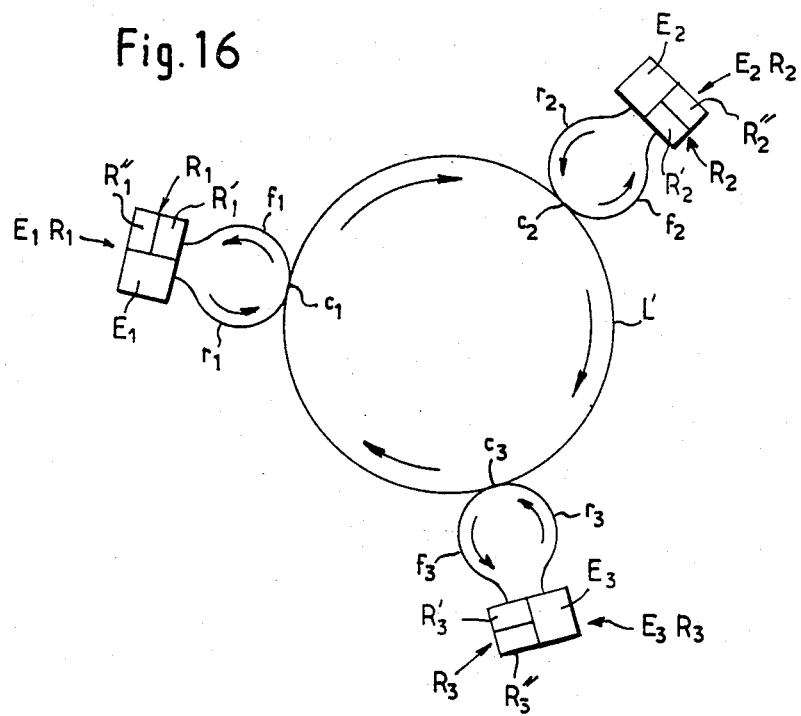

Whereas in the embodiment shown in FIG. 1, the installation comprises a bidirectional line, that is a line within which the optical signals can circulate in one direction or in the other, in the diagram of FIG. 16, line L' is monodirectional and forms a closed loop.

The optical bus line L' provides the communication between a number of stations $E_1R_1$, $E_2R_2$, $E_3R_3$, each of which comprising a transmitter $E_1$, $E_2$, $E_3$, etc., and a receiver, respectively $R_1$, $R_2$, $R_3$, etc.

Each receiver comprises a signal shaping device $R'_1$, $R'_2$, $R'_3$, etc., and a receiver $R''_1$, $R''_2$, $R''_3$, etc., respectively, of the type of those used for the processing of electrical signals, such as those present in the installations having a bus line transmitting electrical signals. Said receivers are supplied from the output of devices $R'_1$, $R'_2$, $R'_3$ respectively.

The transmitters $E_1$, $E_2$, $E_3$ are connected to line L' by "T" couplers, respectively $c_1$, $c_2$, $c_3$ forming the end of connecting lines $r_1$, $r_2$, $r_3$. The couplers $c_1$, $c_2$, $c_3$ are used for the transmission of the signal circulating on line L', via connections $f_1$, $f_2$, $f_3$, to the receivers, respectively $R_1$, $R_2$, $R_3$.

Figure 17:
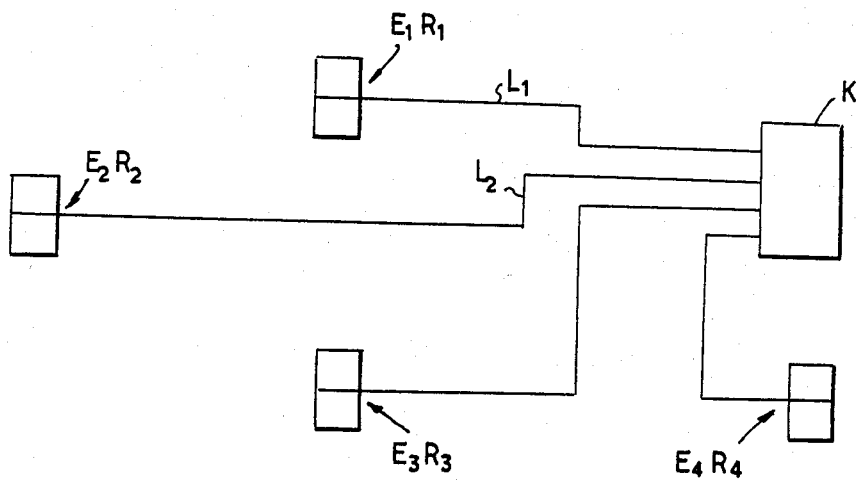

The invention applies also to installations comprising a coupler device K sometimes called star coupler, which is common to several transmitting receiving stations $E_1R_1$, $E_2R_2$, $E_3R_3$, $E_4R_4$ (FIG. 17).

The optical transmissions are carried out between the various transmitting stations each time through coupler K.

For example, a transmission of information between the first station $E_1R_1$ and another station, for example $E_2R_2$, is carried out through a connecting optical line $L_1$ connecting the station $E_1R_1$ to the star coupler K, which carries out the optical communication with line $L_2$ connecting coupler K to station $E_2R_2$.

The coupler station K can also transmit the optical information arriving from one station to all the other stations after an equitable division of the light energy.

In such an installation, the greatest ratios of the light intensities received at one station that are attained from the various other stations can be of the order of 5 to 1, viz. far less than the same ratio in the case of an installation according to FIG. 1 or FIG. 16, as said ratio can, in these latter cases, and all things being otherwise equal, reach 100 to 1.

In the case of an installation according to FIG. 17, the shaping device can omit the second static switch 43.

An installation according to FIG. 17 is a particularly advantageously applicable to assemblies of relatively small dimensions, such as satellites, missiles or small aircrafts.

Installations of a mixed or hybrid type, that is the general organization of which takes some parts of the embodiment shown in FIGS. 1 to 16 as well as parts of the embodiment shown in FIG. 17, are also within the scope of the present invention.

I claim:

1. Apparatus for wave shaping signals transmitted as successive electrical input pulse trains, comprising centering means for substantially centering each input pulse train with respect to a reference level regardless of the pulse amplitude of the input pulse train or of any preceding input pulse train, and wave shaping means for producing a wave-shaped signal in response to said centered pulse train, said centering means comprising a capacitor-resistor circuit including a capacitor, a resistor joined to said capacitor, and a first switch in series with the resistor forming a resistor path to ground, a low pass filter and limiter amplifier having an input connected to a junction of said capacitor and said resistor, and envelope detector means delivering an envelope signal covering the duration of each train, but with a time lag after the beginning of the train, the time lag being shorter than the duration of any pulse in the train, said first switch being controlled to open in response to said envelope signal, with said capacitor and resistor having values selected such that said capacitor-resistor circuit charges the capacitor thereof to substantially half the amplitude of the first incoming pulse of the train, and the voltage across the capacitor thereafter provides a centering of the remaining pulses of the train about said reference voltage.

2. Apparatus according to claim 1, wherein said reference level is at zero volts.

3. Apparatus according to claim 1, wherein said wave shaping means comprises hysteresis comparator means for comparing the amplitude of said centered pulses with respect to said reference voltage.

4. Apparatus according to claim 1, further comprising second switch means for quick discharge of said capacitor at the end of the envelope signal.

5. Apparatus according to claim 1, further comprising opto-electronic converting means for producing said input pulse train in response to optical messages transmitted over an optical line between optical emitters and optical receivers.

6. Apparatus according to claim 1, said envelope detector means being responsive to said waveshaped signal.

7. Apparatus according to claim 1, wherein said amplifier further comprises means for limiting the amplitude of signals at its input.

8. Apparatus according to claim 1, wherein said wave shaping means comprise means responsive to the transition upward across one threshold level above said reference level by said centered pulse train for producing a first signal and to the transition downward across another threshold level below said reference level by said centered pulse train for producing a second signal, said first and second signals together constituting said waveshaped signal.

9. Apparatus for wave-shaping signals transmitted as successive input trains of pulses, the pulses within each train having substantially the same amplitude, but which amplitude may vary substantially from one pulse train to another, comprising accumulating means formed of a capacitor-resistor circuit having a capacitor, a resistor joined to said capacitor, and a switch selectively coupling said resistor to ground the switch being responsive to the first pulse of an input train for charging the capacitor and developing a first electrical voltage level, with respect to a reference level, at a point between an input and an output of the accumulating means, corresponding to a predetermined fraction of the amplitude of such first pulse;

means for controlling discharge of said accumulating means by actuating said switch until a predetermined time has elapsed at which a second voltage level, having a predetermined relationship with respect to the first voltage level, is reached prior to the end of said first pulse, such that the output voltage of said accumulating means is made to consist of pulses having a peak-to-peak amplitude corresponding to that of the input train pulses, but with a mean voltage level shifted with respect to that of the input train pulses;

means detecting the end of a train of said pulses; and means responsive to the detecting means for conditioning said accumulating means for charging with respect to said reference level, after the end of each input pulse train.

10. The apparatus of claim 9, wherein said second level is attained after discharge of said accumulating means in relation to said first level so that the mean voltage level of said output voltage is the same for all pulse trains.

11. The apparatus of claim 10, wherein said mean voltage level is at said reference level.

12. Apparatus for wave shaping optically transmitted signals in the form of successive pulse trains, the pulse amplitude being capable of variation from one train to the next, comprising photoelectric receiver and preamplifier means for changing said optical pulse trains into corresponding electrical voltage pulse trains;

said electrical voltage pulse train however being not centered with respect to a predetermined electrical reference voltage;

a capacitor-resistor circuit having a capacitor, a resistor coupled at a junction to said capacitor, and a first switch in series with the resistor to form a resistor path to ground, and said capacitor receiving said electrical voltage pulse trains;

a low pass filter and limiter amplifier connected to a junction between said capacitor and said resistor;

hysteresis comparator means connected to an output of said low pass filter and limiter amplifier for delivering an output signal corresponding to said successive pulse trains; and envelope detector means delivering an envelope signal covering the duration of each train, however with a time lag after the beginning of the train, said time lag being shorter than the duration of any pulse of the train, said first switch being controlled to open in response to said envelope signal, with said capacitor and resistor having values selected such that said capacitor-resistor circuit charges the capacitor thereof to substantially half the amplitude of the first incoming pulse of the train, and with the voltage across the capacitor thereafter providing a centering of the remaining pulses of the train with respect to said electrical reference voltage.

13. Apparatus in accordance with claim 12, further comprising a second switch between said junction and ground, said second switch being temporarily closed in response to the end of the envelope signal.

14. Apparatus in accordance with claim 12, wherein said output signal is provided as a centered bipolar pulse train, the bipolar pulses thereof having substantially the same duration as the incoming train pulses.

15. Apparatus in accordance with claim 12, wherein said hysteresis comparator means includes a trigger circuit with first and second thresholds respectively in the upward and downward directions and which are symmetrical with respect to said reference voltage.

* * * * *